United States Patent
Ferrara et al.

(10) Patent No.: US 9,980,527 B2
(45) Date of Patent: May 29, 2018

(54) GARMENT PATTERN ENGINEERING UTILIZING TWO-DIMENSIONAL IMAGARY OF THE HUMAN FORM

(71) Applicant: Resonance Companies LLC, New York, NY (US)

(72) Inventors: Joseph Ferrara, New York, NY (US); Lawrence Lenihan, Briarcliff Manor, NY (US)

(73) Assignee: RESONANCE COMPANIES LLC, New York, NY (US)

(*) Notice: Subject to any disclaimer, the term of this patent is extended or adjusted under 35 U.S.C. 154(b) by 91 days.

(21) Appl. No.: 15/169,544

(22) Filed: May 31, 2016

(65) Prior Publication Data
US 2017/0340042 A1 Nov. 30, 2017

(51) Int. Cl.
*G06K 9/00* (2006.01)
*A41H 3/00* (2006.01)
*G06T 11/00* (2006.01)
*G06F 17/50* (2006.01)

(52) U.S. Cl.
CPC ............ *A41H 3/007* (2013.01); *G06F 17/50* (2013.01); *G06T 11/008* (2013.01); *G06F 2217/32* (2013.01)

(58) Field of Classification Search
CPC ..... A41H 3/007; G06F 17/50; G06F 2217/32; G06T 11/008
See application file for complete search history.

(56) References Cited

U.S. PATENT DOCUMENTS

| | | | | |
|---|---|---|---|---|
| 5,590,220 A | * | 12/1996 | Takahashi | G06K 9/48 382/199 |
| 2010/0106475 A1 | * | 4/2010 | Smith | G16H 50/50 703/11 |
| 2013/0305547 A1 | * | 11/2013 | Grove | A41H 3/007 33/17 A |

(Continued)

FOREIGN PATENT DOCUMENTS

WO    WO2001/86512    11/2001

OTHER PUBLICATIONS

Sung et al., Garment pattern generation from body scan data, Elsevier, Mar. 11, 2002, pp. 612-618.*

(Continued)

*Primary Examiner* — Amara Abdi
(74) *Attorney, Agent, or Firm* — Steven M. Greenberg, Esq.; CRGO Law

(57) ABSTRACT

Embodiments of the present invention provide a method, system and computer program product for computer assisted pattern drafting in garment development. In an embodiment of the invention, a pattern making method includes initially acquiring a multiplicity of different two-dimensional image slices of a human form. Thereafter, a panel of a portion of a pattern of a garment is selected for processing in a data processing system and a metric computational rule for the selected panel is mapped to one of the two-dimensional image slices. A measurement of the one of the two-dimensional image slices is then acquired and the mapped metric computational rule is applied using the acquired measurement to produce a measurement for the selected panel.

15 Claims, 2 Drawing Sheets

(56) References Cited

U.S. PATENT DOCUMENTS

2014/0360030 A1\* 12/2014 Grove .................... A41H 3/007
    33/17 R
2015/0134496 A1\* 5/2015 Grinblat ................. G06T 19/00
    705/27.2

OTHER PUBLICATIONS

Kim S M et al. "Garment pattern generation from body scan data" Computer Aided Design, Elsevier Publishers BV., Barking, GB, vol. 35, No. 7, Jun. 1, 2003, pp. 611-618.

\* cited by examiner

GARMENT PATTERN ENGINEERING UTILIZING TWO-DIMENSIONAL IMAGARY OF THE HUMAN FORM

BACKGROUND OF THE INVENTION

Field of the Invention

The present invention relates to computer aided fabrication of garments and more particularly to pattern drafting in garment development.

Description of the Related Art

In sewing and fashion design, a pattern is the template with which the parts of a garment are produced by placing the template upon fabric, tracing the perimeter of the template onto the fabric, cutting the traced portions of the fabric and assembling the cut portions of fabric into a garment. Patterns typically are formed from paper, and sometimes more rigid materials such as paperboard or cardboard so as to support repeated use. The process of making or cutting patterns is known as "patternmaking" and traditionally performed by a patternmaker who typically employs one of two methods to create a pattern. The first method is known as the flat-pattern method in which the entire pattern is drafted on a flat surface from measurements, using rulers, curves and straight-edges. The second method is known as draping which involves creating a muslin mock-up pattern by pinning fabric directly on a form, and subsequently transferring the muslin outline and markings onto a paper pattern or using the muslin as the pattern itself.

The advent of computing has revolutionized patternmaking. Today, different computer applications facilitate the job of creating patterns by allowing the pattern maker to provide as data input to the application different measurements from which a pattern is generated computationally within a data processing system. Most computer aided design (CAD) applications directed to patternmaking additionally allow the pattern maker to fit individual measurements specifically, eliminating much fitting trial and error previously common in the sewing room. Indeed, the computational power of computing greatly eases the way in which garments are designed so as to more readily support not only mass produced articles of clothing, but also custom, individually tailored garments known as "bespoke" articles. In particular, utilizing techniques in computer aided manufacturing (CAM), CAD applications are able to directly drive mechanical or laser cutting equipment to precisely cut fabric into panels to be sewn, as well as to directly drive knitting or sewing machines to assemble the panels.

Within the context of computer driven patternmaking, recent developments in computer automated pattern generation integrate with concepts in three-dimensional imaging. Specifically, it is known today to acquire the measurements of an individual through the use of three-dimensional body scanning. Typically, three-dimensional body scanning is performed utilizing laser imaging in order to produce a computer representation of a scanned human form. Utilizing the scanned human form, a garment surface is defined in relationship to the dimensions of the human form reflected within the computer representation. Once the garment surface has been defined, it is a matter of computational mapping to generate a two-dimensional pattern for printing onto a paper medium using a conventional large format printer.

However, it is of note that three-dimensional body scanning lacks certain detail such as precise perimeter measurements about the surface of the human form. As well, three-dimensional body scanning is unable to readily reveal angular changes in respect to the curvature of the perimeter of the human form. Thus, patterns generated from three-dimensional body scanning lack a degree of precision desirable in producing optimally sized garments.

BRIEF SUMMARY OF THE INVENTION

Embodiments of the present invention address deficiencies of the art in respect to computer aided fabrication of garments, and provide a novel and non-obvious method, system and computer program product for computer assisted pattern drafting in garment development. In an embodiment of the invention, a pattern making method includes initially acquiring a multiplicity of different two-dimensional image slices of a human form stored in a data store. Thereafter, a panel of a portion of a pattern of a garment is selected for processing in a data processing system and a metric computational rule for the selected panel is mapped to one of the two-dimensional image slices. A measurement of the one of the two-dimensional image slices is then acquired and the mapped metric computational rule is applied using the acquired measurement to produce a measurement for the selected panel.

In one aspect of the embodiment, the panel forms part of a saddle or crotch of the garment. In other embodiments, the panel forms part of a pant leg, sleeve, collar, armhole, cuff, elbow, thigh or hip of the garment. In another aspect of the embodiment, the acquired measurement is an angle of curvature of a perimeter portion of the two-dimensional image slice. In yet another aspect of the embodiment, the acquired measurement is a length of a perimeter portion of the two-dimensional image slice. In even yet another aspect of the embodiment, changes in the angle of curvature are monitored and, in response to a threshold change, a different one of the two-dimensional image slices is selected, a different metric computational rule for the selected panel is mapped to a to different one of the two-dimensional image slices, a measurement of the different one of the two-dimensional image slices is acquired, and the mapped different metric computational rule is applied using the acquired measurement of the different one of the two-dimensional image slices to produce a different measurement for the selected panel.

In another embodiment of the invention, a data processing system is configured for pattern making. The system includes a host computing system having one or more computers, each with memory and at least one processor. The system also includes a data store coupled to the host computing system and storing a multiplicity of two-dimensional image slices of a human form acquired either directly through tomographic imaging, indirectly through the transformation of a three-dimensional image, or purely computationally through the specification of particular metrics of a human form. Finally, the system includes a pattern making module executing in the memory of the host computing system. The module includes program code enabled during execution to select a panel of a portion of a pattern of a garment, to map a metric computational rule for the selected panel to one of the two-dimensional image slices, to acquire a measurement of the one of the two-dimensional image slices, and to apply the mapped metric computational rule using the acquired measurement to produce a measurement for the selected panel.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for pattern generation from two-dimensional image slices. In accordance with an embodiment of the invention, a set of two-dimensional (2D) image slices of a human form are retrieved from a data store. Thereafter, one of the 2D image slices is selected for processing and one or more measurements acquired from the selected 2D image slice, such as a length of a perimeter of the selected 2D image slice, an angle of curvature of a perimeter of the selected 2D image slice, or a change in angle from one portion of a perimeter of the selected 2D image slice to an adjacent portion of the perimeter. One or more rules are then applied to the measurements in order to determine one or more dimensions of a corresponding panel for a pattern of a garment. Thereafter, the process can repeat for other 2D image slices or other panels of the pattern. As such, the corresponding panels of the pattern are optimized in dimension in respect to the human form represented in part by the selected 2D image slices.

Figure 1:
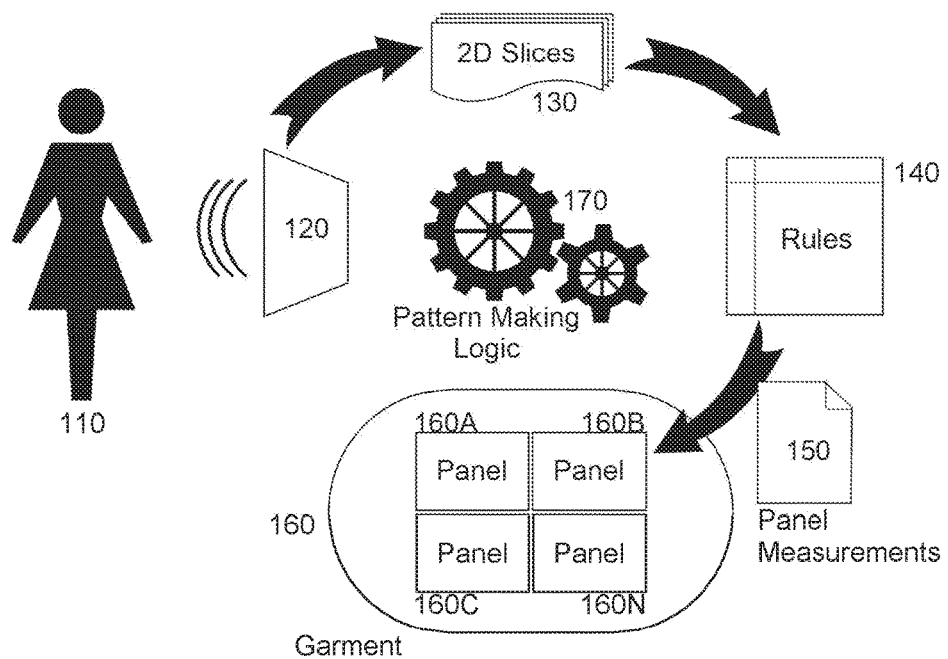
FIG. 1 is a pictorial illustration of a process for pattern generation from two-dimensional image slices.

In further illustration, FIG. 1 pictorially shows a process for pattern generation from 2D image slices. As shown in FIG. 1, a human form 110 is imaged by an imaging device 120, for instance a 2D tomographic imaging device such as a magnetic resonance imaging (MRI) scanning device, a computer aided tomographic (CT) scanning device, or the like. The result of the tomographic imaging by the device 120 is a set of 2D image slices 130. Alternatively, the human form 110 is imaged by a three-dimensional imaging device and the resultant three-dimensional image is processed computationally to produce a set of 2D image slices 130. In either circumstance, pattern making logic 170 then analyzes one or more of the 2D image slices 130 so as to produce one or more measurements such as a length of a portion of a perimeter portion of the 2D image slice 130, an angle of curvature of a perimeter portion of the 2D image slice 130, or a change in angle corresponding to a change in curvature of a perimeter portion of the 2D image slice 130.

Figure 2:
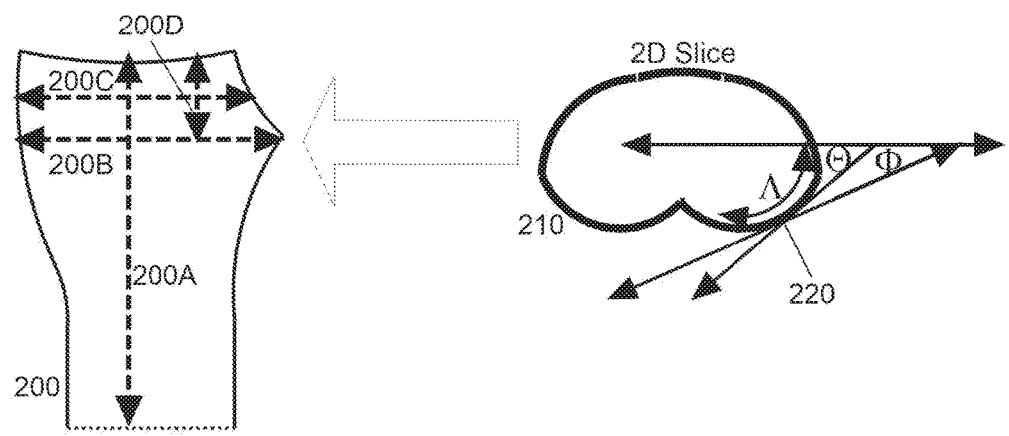
FIG. 2 is a pictorial illustration of a process for mapping a two-dimensional tomographic image slice to a pattern for a garment.

The pattern making logic 170 then applies one or more rules 140 to each set of measurements for a corresponding one of the 2D image slices 130 with respect to one or more panels 160A, 160B, 160C, 160N defining a garment 160 in order to produce panel measurements 150 for the panels 160A, 160B, 160C, 160N. In this regard, the panels 160A, 160B, 160C, 160N each may form part of a saddle or crotch of the garment 160, or the panels 160A, 160B, 160C, 160N each may form part of a pant leg, sleeve, collar, armhole, cuff, elbow, thigh or hip of the garment 160. The rules 140 specifically dictate different measurements of the corresponding panels 160A, 160B, 160C, 160N. For instance, as shown in FIG. 2, any of a length A of a perimeter 220 of a 2D image 210, an angle of curvature $\Theta$ of the perimeter 220, a difference between the angle of curvature $\Theta$ and an angle of curvature $\Phi$ of an adjacent portion of the perimeter 220, or a rate of change of the angles $\Theta$, $\Phi$ along the perimeter 220 can be mapped by rules to one or more measurements 200A, 200B, 200C, 200D of a panel 200.

As such, returning now to FIG. 1, once the panel measurements 150 have been determined based upon the rules 140, pattern making logic 170 produces a printable form of each of the panels 160A, 160B, 160C, 160N with corresponding panel measurements 150 applied so as to result in an optimal pattern for the garment 160 in respect to the human form 120 or a portion thereof. Importantly, the process shown in FIG. 1 can be implemented in a garment manufacturing data processing system. In yet further illustration, FIG. 3 schematically shows a garment manufacturing data processing system configured for pattern generation from two-dimensional image slices.

Figure 3:
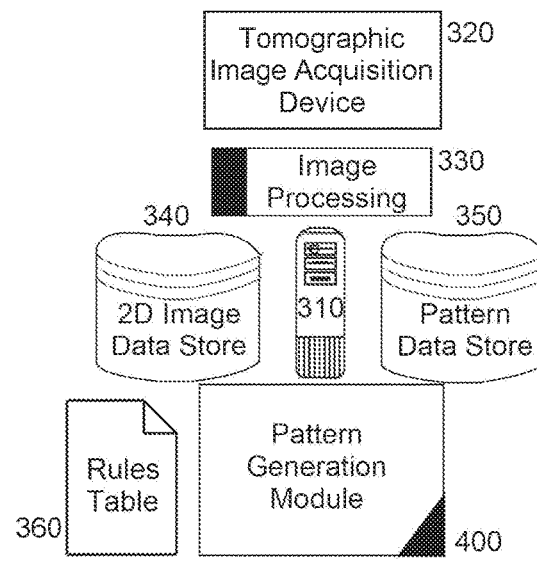
FIG. 3 is a schematic illustration of a garment manufacturing data processing system configured for pattern generation from two-dimensional image slices; and, FIG. 4 is a flow chart illustrating a process for pattern generation from two-dimensional image slices.

The system shown in FIG. 3 includes a host computing system 310. The host computing system 310 includes one or more computers, each with memory and at least one processor (only a single computer shown for ease of illustration). The host computing system 310 is coupled to an image acquisition device 320 such as a three-dimensional laser scanner, or a 2D tomographic imaging MRI scanner or CT scanner. An image processing program 330 executes in the connection with the image acquisition device 320 and the host computing system 310 in order to generate and store different 2D image slices in 2D image data store 340 coupled to the host computing system 310. In this regard, to the extent that a 2D tomographic imaging device is employed, the resultant 2D image slices are stored in 2D image data store 340 directly. Otherwise, to the extent that a three-dimensional imaging device is employed, the resultant three-dimensional image is computationally processed by host computing system 310 into the resultant 2D image slices which are then stored in 2D image data store 340.

Of note, a pattern generation module 400 executes in the memory of the host computing system 310. The pattern generation module 400 includes program code that when executed in the memory of the host computing system 310 by a processor of the host computing system 310, is enabled to select different 2D image slices from the 2D image data store 340, determine one or more measurements for each selected 2D image slice, apply one or more rules in a rules table 360 to the measurements of each selected 2D image so as to compute one or more measurements for one or more corresponding panels of a pattern in a coupled pattern data store 350, and to store the generated pattern with the panels in the pattern data store 350. In this regard, the program code of the pattern generation module 400 may be enabled to compute a dimension of a panel of a pattern as a function of a length of a portion of a perimeter of a corresponding 2D image slice, as a function of an angle of curvature of a portion of a perimeter of a corresponding 2D image slice, or as a function of a change in an angle of curvature of a portion of a perimeter of a corresponding 2D image slice.

Figure 4:
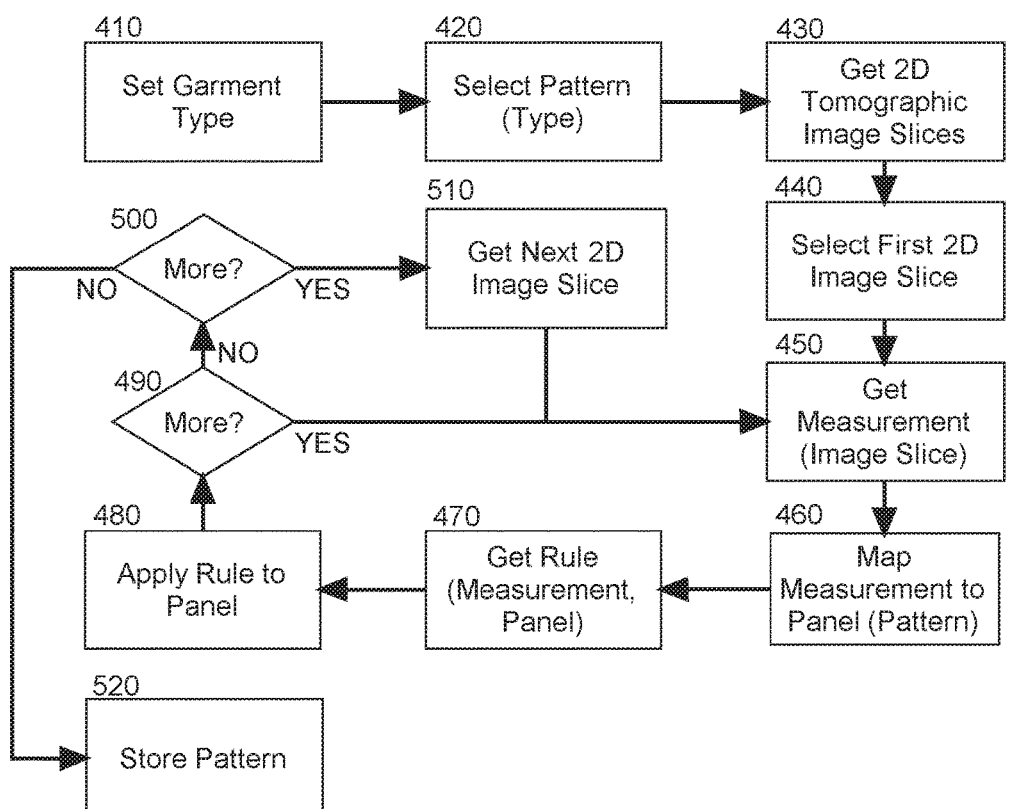

In even yet further illustration of the operation of the pattern generation module 400, FIG. 4 is a flow chart illustrating a process for pattern generation from two-dimensional image slices. Beginning in block 410, a type of garment is specified, such as pants, a shirt or a jacket to name only a few examples. In block 420, a pattern of one or more panels is selected based upon the type of garment. In block 430, a selection of 2D image slices disposed in a data store are retrieved for processing and in block 450 a first one of the 2D image slices is selected for processing.

Thereafter, in block 450 a first measurement is computed for the selected 2D image slice and block 460, the measurement is mapped to a particular panel of the pattern. In block 470, a rule is retrieved for processing the particular measurement in connection with a dimension of the particular panel and in block 480, the retrieved rule is applied to the measurement in order to compute a dimension of the particular panel. Finally, in decision block 490, if additional measurements remain to be computed for the selected 2D image slice, the process repeats in block 450 with the computation of a new measurement for the selected 2D image slice.

In decision block 490, if no more measurements remain to be computed for the selected 2D image slice, in decision block 500 it is determined if additional 2D image slices remain to be processed. If so, a next 2D image slice is selected for processing in block 510 and the process repeats in block 450 with the computation of a new measurement for the newly selected 2D image slice. However, in decision block 500, if it is determined that no additional 2D image slices remain to be processed, in block 520 the pattern of panels with determined dimensions are stored in pattern data store and the process ends.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A pattern making method comprising:
    acquiring into memory of a computer, a multiplicity of different two-dimensional image slices of a human form;
    selecting by a processor of the computer, a panel of a portion of a pattern of a garment;
    acquiring by the processor of the computer a measurement of the one of the two-dimensional image slices;
    mapping the acquired measurement to the selected panel;
    retrieving a metric computation rule for both the measurement and the selected panel;
    applying by the processor of the computer the retrieved metric computational rule using the acquired measurement to produce a measurement for the selected panel; and
    including the selected panel with produced measurement in a printable form of the selected panel.

2. The method of claim 1, wherein the panel forms part of a saddle of the garment.

3. The method of claim 1, wherein the acquired measurement is an angle of curvature of a perimeter portion of the two-dimensional image slice.

4. The method of claim 1, wherein the acquired measurement is a length of a perimeter portion of the two-dimensional image slice.

5. The method of claim 3, further comprising monitoring changes in the angle of curvature and in response to a threshold change, selecting a different one of the two-dimensional image slices, mapping a different metric computational rule for the selected panel to different one of the two-dimensional image slices, acquiring a measurement of the different one of the two-dimensional image slices and applying the mapped different metric computational rule using the acquired measurement of the different one of the two-dimensional image slices to produce a different measurement for the selected panel.

6. A data processing system configured for pattern making comprising:
    a host computing system comprising one or more computers, each with memory and at least one processor;
    a data store coupled to the host computing system and storing a multiplicity of two-dimensional image slices of a human form; and
    a pattern making module executing in the memory of the host computing system, the module comprising program code enabled during execution to select a panel of a portion of a pattern of a garment, to acquire a measurement of the one of the two-dimensional image slices, map the acquired measurement to the selected panel, to retrieve a metric computation rule for both the measurement and the selected panel, to apply the retrieved metric computational rule using the acquired measurement to produce a measurement for the selected panel and to include the selected panel with produced measurement in a printable form of the selected panel.

7. The system of claim 6, wherein the panel forms part of a saddle of the garment.

8. The system of claim 6, wherein the acquired measurement is an angle of curvature of a perimeter portion of the two-dimensional image slice.

9. The system of claim 6, wherein the acquired measurement is a length of a perimeter portion of the two-dimensional image slice.

10. The system of claim 8, wherein the program code is further enabled upon execution to monitor changes in the angle of curvature and in response to a threshold change, to select a different one of the two-dimensional image slices, to map a different metric computational rule for the selected panel to different one of the two-dimensional image slices, to acquire a measurement of the different one of the two-dimensional image slices and to apply the mapped different metric computational rule using the acquired measurement of the different one of the two-dimensional image slices to produce a different measurement for the selected panel.

11. A computer program product for pattern making, the computer program product comprising a non-transitory computer readable storage medium having program instructions embodied therewith, the program instructions executable by a device to cause the device to perform a method comprising:
    acquiring a multiplicity of different two-dimensional image slices of a human form;
    selecting a panel of a portion of a pattern of a garment;
    acquiring a measurement of one of the two-dimensional image slices;
    mapping the acquired measurement to the selected panel;
    retrieving a metric computation rule for both the measurement and the selected panel;
    applying the retrieved metric computational rule using the acquired measurement to produce a measurement for the selected panel; and
    including the selected panel with produced measurement in a printable form of the selected panel.

12. The computer program product of claim 11, wherein the panel forms part of a saddle of the garment.

13. The computer program product of claim 11, wherein the acquired measurement is an angle of curvature of a perimeter portion of the two-dimensional image slice.

14. The computer program product of claim 11, wherein the acquired measurement is a length of a perimeter portion of the two-dimensional image slice.

15. The computer program product of claim 13, where the method further comprises monitoring changes in the angle of curvature and in response to a threshold change, selecting a different one of the two-dimensional image slices, mapping a different metric computational rule for the selected panel to different one of the two-dimensional image slices, acquiring a measurement of the different one of the two-dimensional image slices and applying the mapped different metric computational rule using the acquired measurement of the different one of the two-dimensional image slices to produce a different measurement for the selected panel.

* * * * *